United States Patent
Sakai

(10) Patent No.: US 6,473,194 B1
(45) Date of Patent: Oct. 29, 2002

(54) IMAGE PROCESSING APPARATUS AND METHOD

(75) Inventor: Akihiko Sakai, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,161

(22) Filed: Dec. 23, 1999

(30) Foreign Application Priority Data

Dec. 25, 1998 (JP) ............................................. 10-371650

(51) Int. Cl.$^7$ .............................................. G06K 15/00
(52) U.S. Cl. ...................................... 358/1.17; 358/1.1
(58) Field of Search ........................... 358/1.1, 1.2, 1.9, 358/1.13, 1.14, 1.18, 1.17, 437, 406, 405, 434, 468; 705/54; 380/259, 287, 59; 713/182, 189, 193, 194, 200

(56) References Cited

U.S. PATENT DOCUMENTS 5,602,973 A * 2/1997 Nishiwaki .................... 271/298
5,720,012 A * 2/1998 McVeigh et al. ........... 358/1.14

* cited by examiner

Primary Examiner—Arthur G. Evans
(74) Attorney, Agent, or Firm—Fitzpatrick, Cella, Harper & Scinto

(57) ABSTRACT

An image forming apparatus to which a storage unit such as an electronic sorter unit is attached is designed to more reliably prevent output of an image that is prohibited from being copied. An electronic sorter unit attached to the image forming apparatus has an external storage unit for storing image data. It is determined whether an image represented by the image data is a copy-prohibited image. Determination information representing the determination result is stored in the external storage unit in correspondence with the image data. The digital image processing unit permits formation of only an image represented by image data that is permitted by the determination information to be copied. When the electronic sorter unit is detached from the main body of the image forming apparatus, power to the nonvolatile memory is interrupted, and the stored contents volatilize. When the apparatus is started up, the contents of the nonvolatile memory are checked to determine whether the unit is detached. If it is determined that the unit is detached, the nonvolatile storage unit is initialized.

25 Claims, 11 Drawing Sheets

IMAGE PROCESSING APPARATUS AND METHOD

BACKGROUND OF THE INVENTION

1. Field of the Invention

The present invention relates to an image processing apparatus, image processing method, and storage medium.

2. Description of the Related Art

As an image forming apparatus, an apparatus designed to digitize an input image and process the resultant data is known. For an image forming apparatus of this type, a so-called electronic sort function has been proposed. According to this electronic sort function, a plurality of image data input from an image information input unit are stored in a large-capacity storage medium such as a hard disk. When the plurality of stored image data are to be output from an image information output unit, the output order of output images can be changed regardless of the input order of image data, or a plurality of copies of recorded image data that is input by image input processing once can be output.

Such an electronic sort function is not a minimum requirement for an image forming apparatus. In addition, to implement this function, an expensive component such as a hard disk must be mounted in the image forming apparatus. For these reasons, a unit for implementing this function (to be referred to as an electronic sorter unit hereinafter) is generally treated as an additional unit for the image forming apparatus. Obviously, this unit is generally treated as a unit that can be attached/detached to/from the image forming apparatus.

Paper currency, notes, and the like can be easily counterfeited by using an image forming apparatus, represented by a color electrophotographic image forming apparatus, which can from high-quality images. This problem has been pointed out. For this reason, an image forming apparatus incorporates the function of automatically recognizing an original image prohibited from being copied, e.g., paper currency or note, when it is input through an image input unit, and prohibiting or interrupting image output operation for the corresponding image.

Assume that the above electronic sorter unit is added to such an image forming apparatus with high image quality. In this case, in order to record image data on the electronic sorter unit at a high speed, the image data may be completely recorded on the electronic sorter unit before it is determined whether the corresponding image is prohibited from being copied. That is, even if an original image prohibited from being copied, e.g., paper currency or note, is input through the image input unit, the image data may be stored in a large-capacity storage unit such as a hard disk in the electronic sorter unit.

In order to prohibit an image forming apparatus having an electronic sort function from counterfeiting paper currency, notes, and the like, an attempt was made to additionally record fraudulent image identification result information, which is obtained after image data is recorded on the electronic sorter unit, to the image data. In this case, when the image data is to be output through the image information output unit, whether to prohibit the image information output unit from outputting the corresponding image or not is determined in accordance with the fraudulent image identification result information added to the original image.

In the above scheme as well, however, original image data prohibited from being copied can be output by the following procedure. When image information data is completely input to the electronic sorter unit, the electronic sorter unit is detached from the image forming apparatus. The fraudulent image identification result information added to the original image data stored in the large-capacity storage unit in the detached electronic sorter unit is tampered. Thereafter, the electronic sorter unit is attached to the main body of the image forming apparatus again.

SUMMARY OF THE INVENTION

It is an object of the present invention to provide an image processing apparatus and method and a storage medium which can solve the above problem.

It is another object of the present invention to provide an image processing apparatus and method and a storage medium which prevent formation of fraudulent images.

In order to achieve the above objects, according to a preferred example of the present invention, there is provided an image processing apparatus comprising first storage means for storing image information as image data in a detachable storage unit; second storage means for determining whether the image information stored in the storage unit is a copy-prohibited image, and storing determination information indicating the determination result in the storage unit in correspondence with the image data; image formation control means for permitting formation of an image of the image data stored in the storage unit when the determination information corresponding to the image data permits copy operation; detection means for detecting occurrence of detachment of the storage unit in the past; and erase means for erasing contents stored in the storage unit when the detection means detects occurrence of detachment of the storage unit in the past.

It is still another object of the present invention to provide an image processing apparatus having a new function, an image processing method, and a storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a flow chart for explaining the operation of an electronic sorter control unit in the embodiment at power-on.

DETAILED DESCRIPTION OF THE PREFERRED EMBODIMENTS

Figure 1:
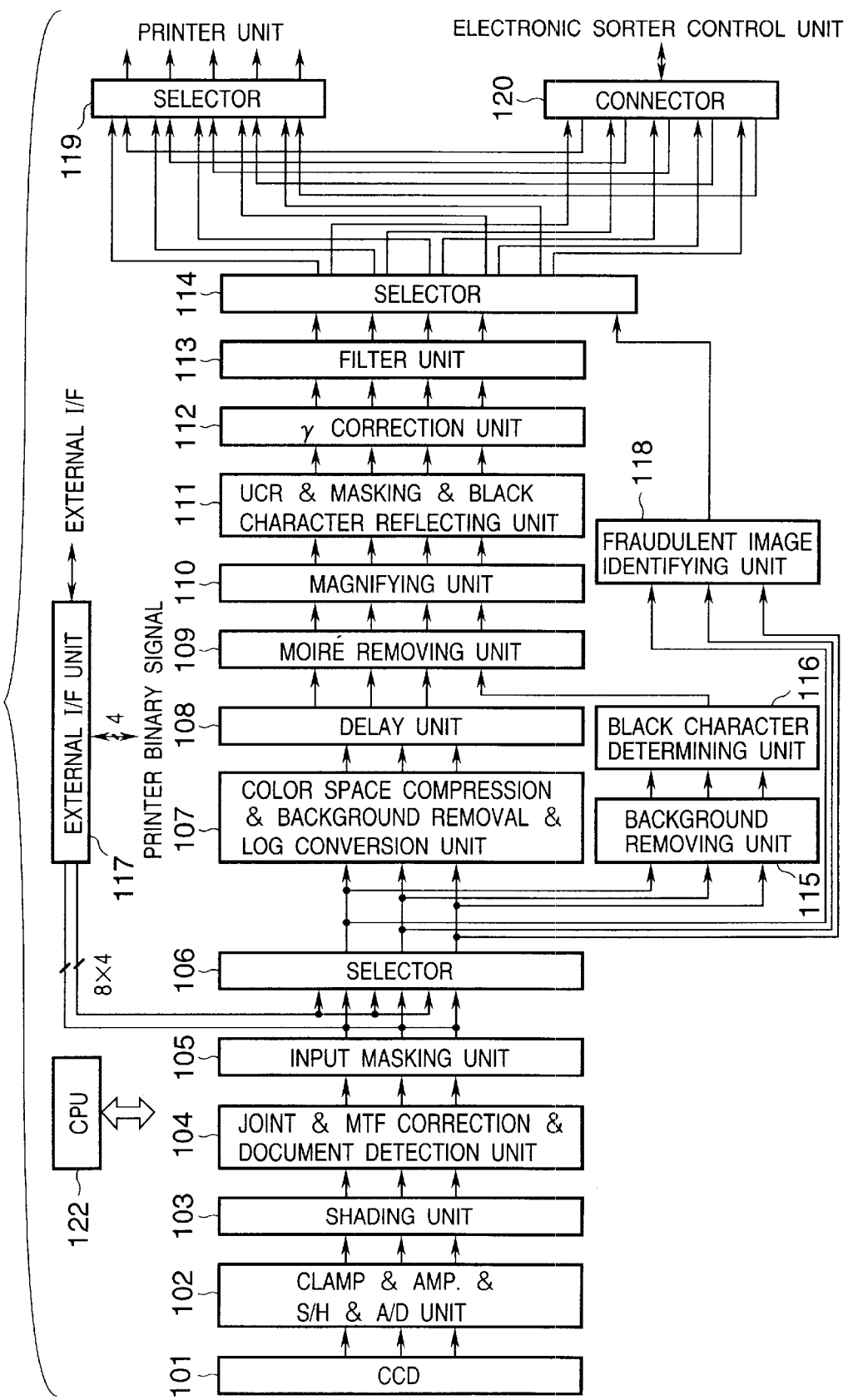
FIG. 1 is a block diagram showing the detailed arrangement of a digital image processing unit 312.
Figure 2:
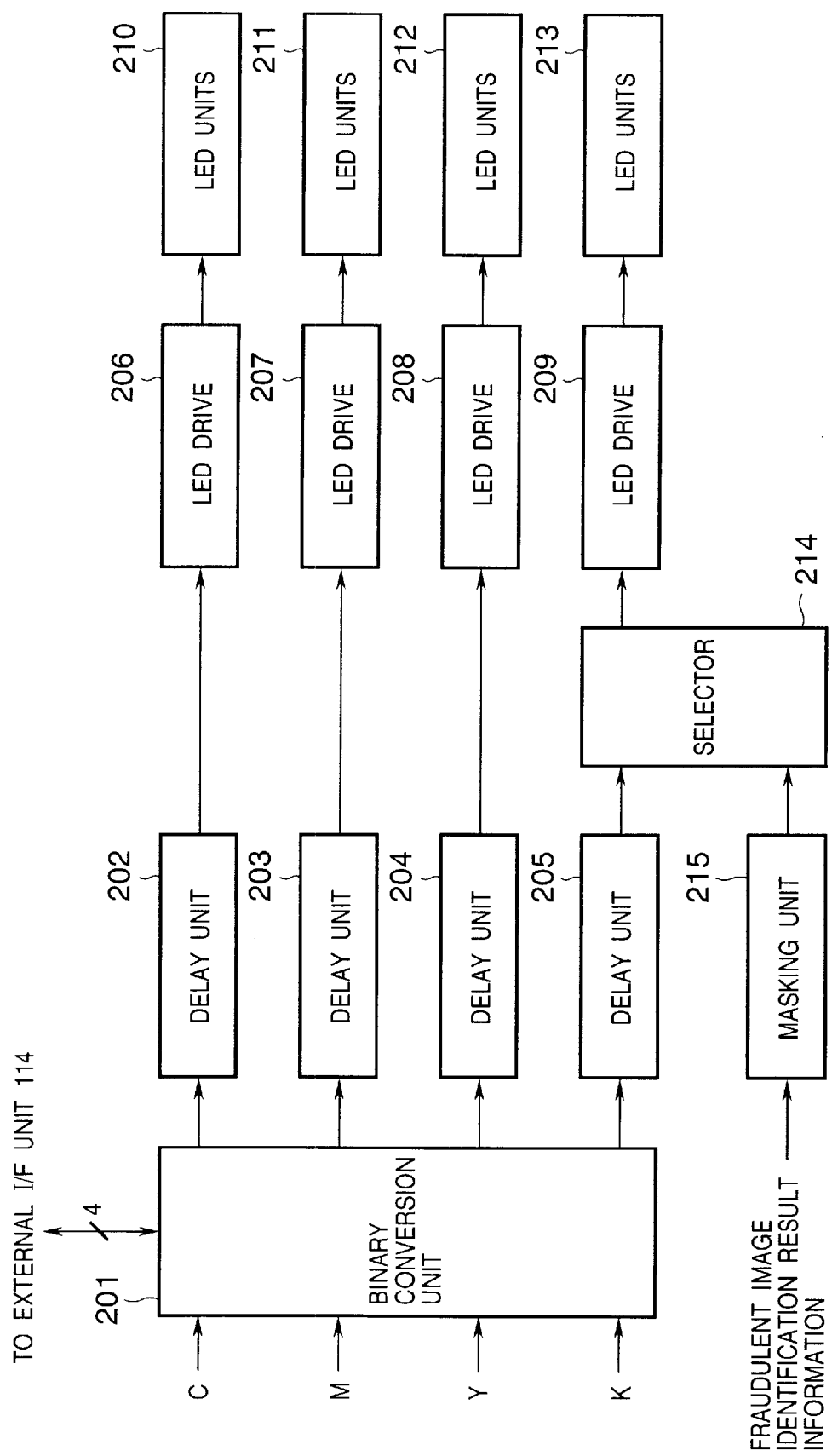
FIG. 2 is a block diagram showing the detailed arrangement of a printer processing unit.
Figure 3:
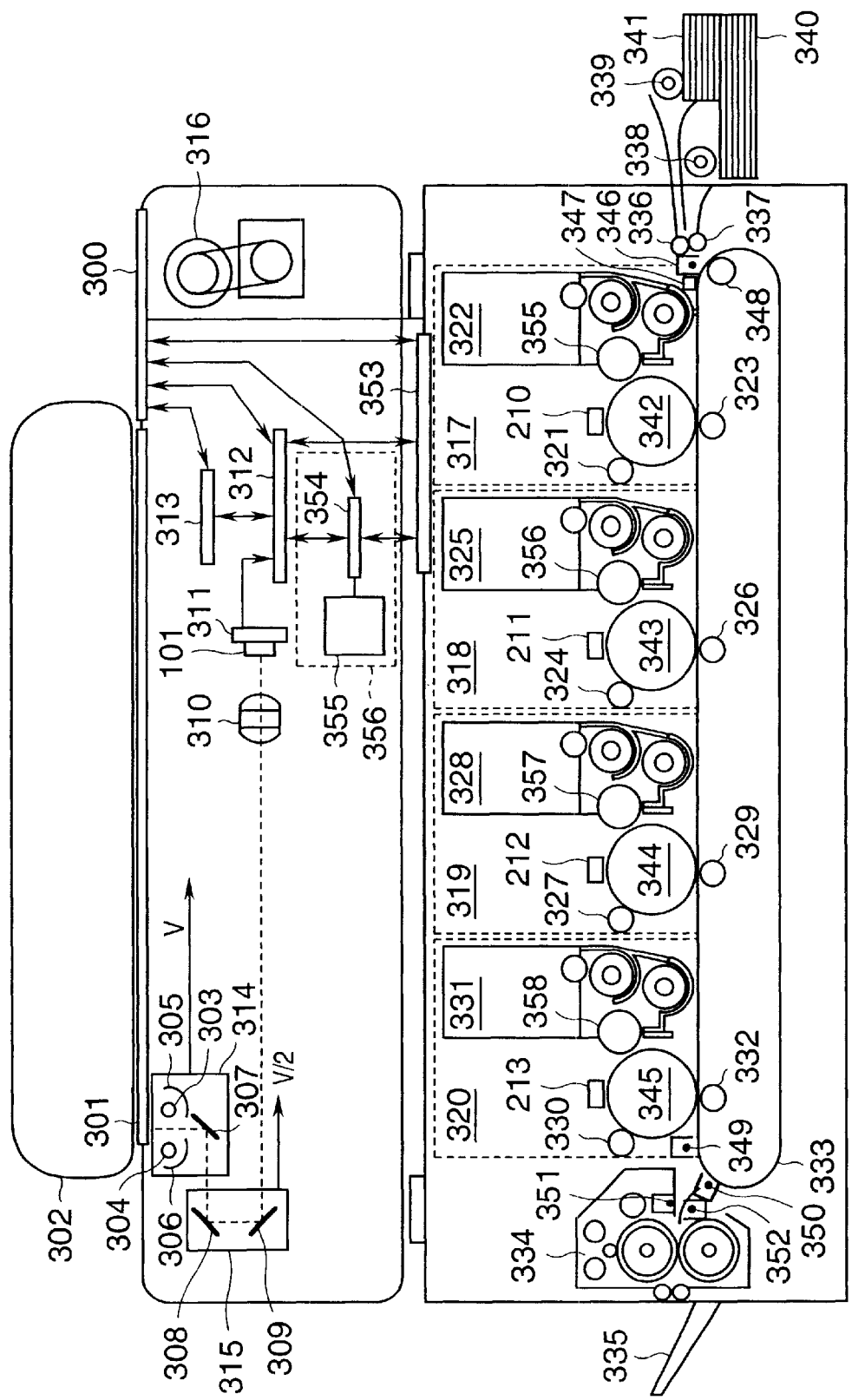
FIG. 3 is a sectional view showing the overall arrangement of an image forming apparatus according to an embodiment of the present invention.

FIGS. 1 to 3 are views for explaining the arrangement of an image forming apparatus according to an embodiment of the present invention. The basic arrangement of this embodiment will be described first with reference to these drawings.

[Arrangement of Color Reader Unit]

The arrangement of a color reader unit will be described first.

FIG. 3 shows the overall arrangement of the image forming apparatus according to this embodiment. Referring to FIG. 3, reference numeral 101 denotes a CCD; 311, a board on which the CCD 101 is mounted; 300, a control unit for controlling the overall image forming apparatus; 312, a printer processing unit, which includes units 201 to 205 in FIG. 2 and the units of the image processing unit shown in FIG. 1 except the CCD 101; 301, an original table glass (platen); and 302, a document feeder (DF). Note that this apparatus may have a mirror pressure plate (not shown) in place of the document feeder 302.

Reference numerals 303 and 304 denote light sources (halogen lamps or fluorescent lamps) for illuminating an original; 305 and 306, reflectors for focusing light from the light sources 303 and 304 onto the original; 307 to 309, mirrors; 310, a lens for focusing reflected light or projected light from the original onto the CCD 101; 314, a carriage accommodating the halogen lamps 303 and 304, reflectors 305 and 306, and mirror 307; 315, a carriage accommodating the mirrors 308 and 309; and 313, an external interface (I/F) for interfacing with other devices. Note that the carriages 314 and 315 mechanically move in a direction perpendicular to the electrical scanning (main scanning) direction of the CCD 101 at velocities V and V/2, respectively, to scan (sub-scan) the entire surface of the original.

Figure 4:
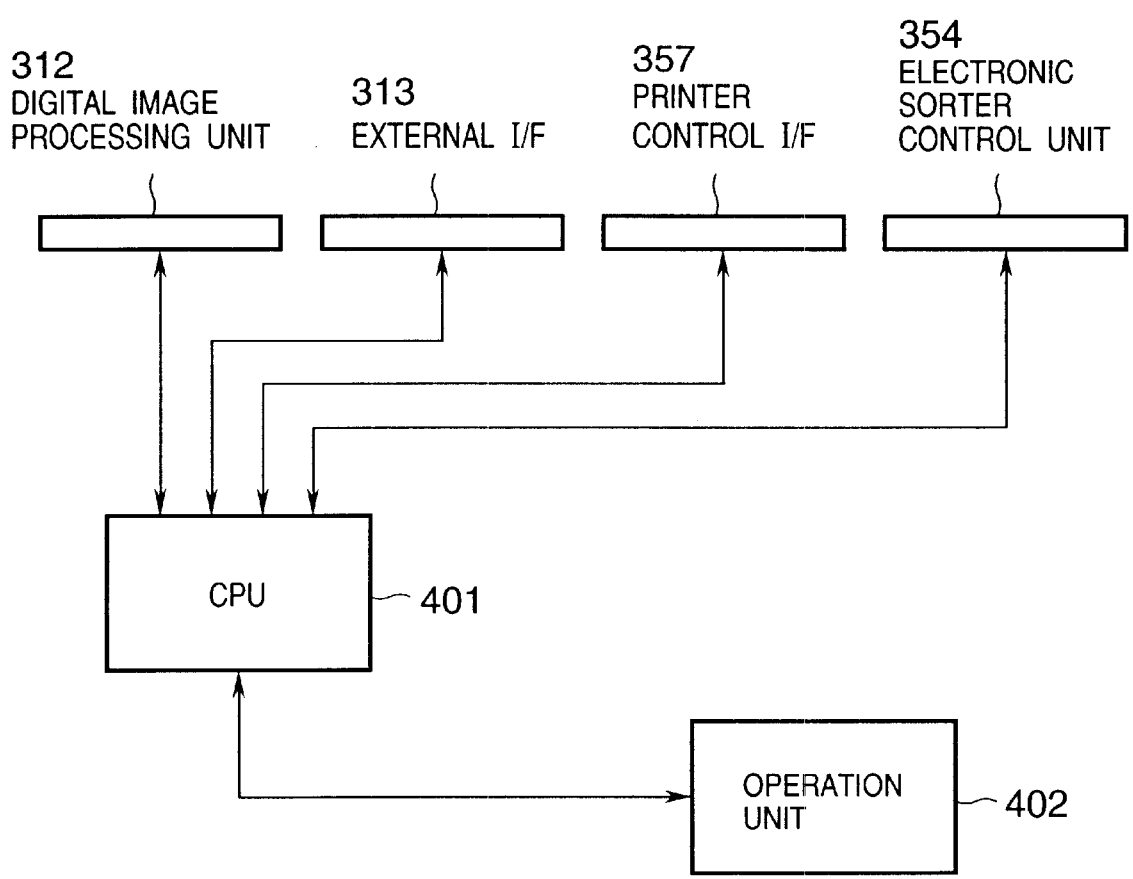
FIG. 4 is a block diagram for explaining a control unit of the image forming apparatus of the embodiment in detail.

The control unit 300 is constituted by a CPU 401 and operation unit 402, as shown in FIG. 4. The CPU 401 has an I/F for exchanging control information with the printer processing unit 312, the external I/F 313, a printer control I/F 353, and an electronic sorter control unit 354. The operation unit 402 has a liquid crystal display with a touch panel which is used by an operator to input the contents of processing execution and informs the user of information associated with processing.

Figure 5:
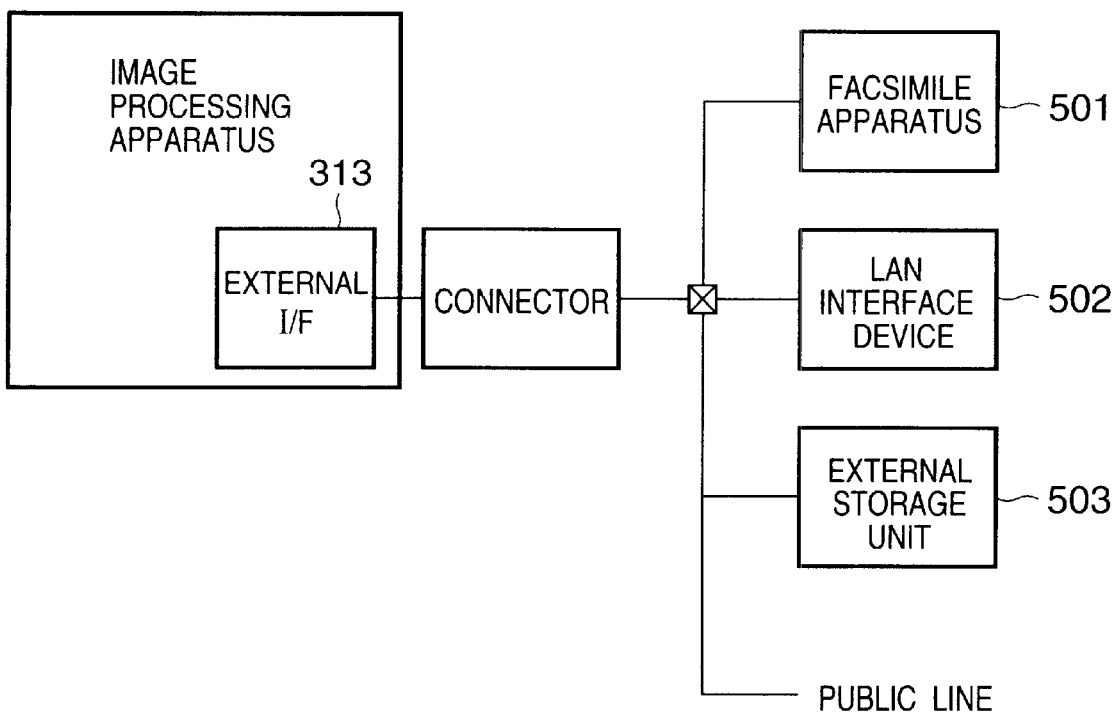
FIG. 5 is a block diagram showing devices that can be connected to the image forming apparatus of this embodiment through an external I/F and the connected state.

The external I/F 313 is an interface for exchanging image information and code information with devices outside the image forming apparatus. More specifically, as shown in FIG. 5, a facsimile apparatus 501, LAN interface device 502, external storage unit 503, public line, and the like can be connected to the external I/F 313. Note that the exchange of image information and code information with the facsimile apparatus 501 and LAN interface device 502, i.e., procedure control, is performed by mutual communication between the facsimile apparatus 501 and LAN interface device 502, serving as connection units, and the CPU 401 of the control unit 300.

The digital image processing unit 312 will be described in detail next. FIG. 1 is a block diagram showing the detailed arrangement of the digital image processing unit 312 in FIG. 1. The original on the original table glass reflects light from the light sources 303 and 304. The reflected light is guided to the CCD 101 to be converted into electrical signals. If the CCD 101 is a color sensor, R, G, and B color filters may be mounted on one CCD line in an inline form in the order of R, G, and B, or R, G, and B filters may be arranged on three CCD lines side by side. Alternatively, on-chip filters may be used, or filters may be formed independently of the CCD.

The electrical signals (analog image signals) are input to the digital image processing unit 312. A clamp & Amp. & S/H & A/D unit 102 then samples/holds (S/H) the signals, clamps the dark level of each analog image signal to a reference potential, amplifies the signal to a predetermined level (the processing order is not limited to that described above), and A/D-converts the signal into, for example, R, G, and B digital signals each consisting of eight bits. A shading unit 103 performs shading correction and black correction for the R, G, and B signals. Thereafter, a joint & MTF correction & original detection unit 104 executes joint processing, MTF correction processing, and original detection processing. If, for example, the CCD 101 is a 3-line CCD, the read positions on the respective lines differ from each other. For this reason, in joint processing, the delay amounts of the respective lines are adjusted in accordance with the read speed to correct the signal timing to make the read positions on the three lines coincide with each other. MTF in read operation changes depending on the read speed and magnification. For this reason, MTF correction is performed to correct such a change. Original detection is performed to recognize the size of an original by scanning the original on the original table glass.

An input masking unit 105 corrects the spectral characteristics of the CCD 101 and the spectral characteristics of the light sources 303 and 304 and reflectors 305 and 306 by using the digital signals having undergone read position timing correction. The outputs from the input masking unit 105 are input to a selector 106 and external I/F unit 117. The selector 106 selects either the input signals from the external I/F unit 117 or the input signals from the input masking unit 105, and outputs them to a color space compression & background removal & LOG conversion unit 107.

The signals output from the selector 106 are input to the color space compression & background removal & LOG conversion unit 107 and a background removing unit 115. Each signal input to the background removing unit 115 is subjected to background removal and input to a black character determining unit 116 for determining whether the input signal represents a black character on the original. The black character determining unit 116 then generates a black character signal representing a black character portion on the original. The color space compression & background removal & LOG conversion unit 107, to which the outputs from the selector 106 are input, determines whether each read image signal falls within the range in which it can be reproduced by the printer upon color space compression. If the image signal falls within the range, no correction is performed. If the signal falls outside the range, the signal is corrected to fall within the range in which it can be reproduced by the printer. Background removal processing is then performed, and LOG conversion is performed to convert the R, G, and B signals into C, M, and Y signals.

A delay unit 108 adjusts the timings of the output signals from the color space compression & background removal & LOG conversion unit 107 with respect to the signals generated by the black character determining unit 116. A moire removing unit 109 removes moire components from these two types of signals. A magnifying unit 110 magnifies the signals in the main scanning direction. Reference numeral 111 denotes a UCR & masking $ black character reflecting unit for generate C, M, Y, and K signals by performing UCR processing for the C, M, and Y signals processed by the magnifying unit 110. The masking processing unit corrects the signals into signals suited to output operation of the printer. In addition, the determination signals generated by the black character determining unit 116 are fed back to the C, M, Y, and K signals. The signals processed by the UCR & masking & black character reflecting unit 111 are subjected to density adjustment in a γ correction unit 112, and subjected to smoothing or edge processing in a filter unit 113.

The signals from the selector 106 are also transferred to a fraudulent image identifying unit 118 at the same time. The fraudulent image identifying unit 118 holds at least one piece of signal pattern information for identifying input fraudulent image data representing paper currency, securities, or the like which is prohibited from being imaged. The fraudulent image identifying unit 118 compares each input image signal pattern with the held signal pattern information to check on the basis of the similarity whether the input image is a fraudulent image. The fraudulent image identification result information obtained by this determination is transferred as a signal to a selector 114.

The signals processed above and fraudulent image identification result information are input to the selector 114 to be transferred to either a selector 119 or connector 120. The connector 120 is connected to the electronic sorter control unit 354 (FIG. 4). The C, M, Y, and K signals and fraudulent image identification result information signal from the color reader are output to the electronic sorter control unit 354.

The selector 119 selectively outputs the C, M, Y, and K signals and fraudulent image identification result information signal from the color reader or those input from the electronic sorter control unit 354 through the connector 120 to the printer unit (printer control I/F 357 in FIG. 4). The print unit then forms an image on an output paper sheet.

[Arrangement of Printer Unit]

The arrangement of the printer unit will be described next.

Referring to FIG. 3, the printer control I/F 353 receives control signals from the CPU 401 of the color reader unit. The printer unit performs the following operation on the basis of control signals from the printer control I/F 353.

Referring to FIG. 3, reference numeral 317 denotes an M image forming unit; 318, a C image forming unit; 319, a Y image forming unit; and 320, a K image forming unit. Since all the image forming units 317 to 320 have the same arrangement, the M image forming unit 317 will be described in detail below, but a description of the remaining image forming units will be omitted.

In the M image forming unit 317, reference numeral 342 denotes a photosensitive drum having a surface on which a latent image is formed by light from an LED array 210; 321, a primary charger which charges the surface of the photosensitive drum 342 to a predetermined potential to prepare for the formation of a latent image; and 322, a developing unit for developing the latent image on the photosensitive drum 342 to form a toner image. Note that the developing unit 322 includes a sleeve 355 for applying a developing bias to develop the latent image. Reference numeral 323 denotes a transfer charger for discharging from the rear surface of a transfer belt 333 to transfer the toner image on the photosensitive drum 342 onto a printing sheet or the like on the transfer belt 333. Obviously, this embodiment may have a cleaner unit, although no cleaner unit is used because of a high transfer efficiency.

A procedure for forming an image on a printing sheet or the like will be described next. Printing sheets or the like stored in cassettes 340 and 341 are picked up one by one by pickup rollers 339 and 338 and fed onto the transfer belt 333. The fed printing sheet is charged by an attraction charger 346. Reference numeral 348 denotes a transfer belt roller which drives the transfer belt 333 and paired with the attraction charger 346 to charge a printing sheet or the like to attract the printing sheet or the like on the transfer belt 333; and 347, a sheet leading end sensor for detecting the leading end of a printing sheet or the like on the transfer belt 333. A detection signal from the sheet leading end sensor 347 is sent from the printer unit to the color reader unit to be used as a sub-scanning sync signal when a video signal is sent from the color reader unit to the printer unit.

Subsequently, the printing sheet or the like is conveyed by the transfer belt 333, and the image forming units 317 to 320 form M, C, Y, and K toner images on the surface of the printing sheet in the order named. The printing sheet or the like that has passed through the K image forming unit 320 is discharged by a discharger 349 to make it easy to separate the sheet from the transfer belt 333, and the sheet is separated from the transfer belt 333. Reference numeral 350 denotes a separation charger for preventing an image disturbance due to separation discharge caused when the printing sheet or the like is separated from the transfer belt 333. The separated printing sheet or the like is charged by pre-fixing chargers 351 and 352 to prevent an image disturbance by complementing the attraction force of the toner. Thereafter, each toner image is thermally fixed by a fixing unit 334. The printing sheet is discharged onto a paper discharge tray.

FIG. 2 is a block diagram showing the detailed arrangement of the printer processing unit. Normal LED image recording and black solid image recording corresponding to fraudulent image identification information will be described with reference to FIG. 2. First of all, the C, M, Y, and K (cyan, magenta, yellow, and black) image signals generated by the image processing unit 312 in FIG. 3 are binarized by a binary conversion unit 201 at the timing based on a sheet leading end signal from the sheet leading end sensor 347. Delay units 202 to 205 respectively adjust the output timings of the binarized image signals in accordance with the differences between the distances from the sheet leading end sensor and the respective image forming units. As a result, four color images are printed at predetermined positions. The image signals having undergone timing adjustment are respectively input to LED drives 206 to 209. In addition, in LED units 210 to 213, LEDs corresponding to the image signals are turned on to form a latent image on the photosensitive drum.

In this case, only the K (black) image signal output through the delay unit 205 is not directly input to the LED drive but is input. to a selector 214. In this case, a fraudulent image identification result information signal from the fraudulent image identifying unit 118 in the image processing unit 312 is input to the selector 214. If the fraudulent image identification information signal does not indicate fraud of the input image, the K (black) image signal is directly sent to the LED drive 209 to perform general image formation. If, however, the fraudulent image identification result information signal indicates fraud of the input image, the signal output from the selector 214 is automatically switched to a black solid image output from a masking unit 215 instead of a K (black) image signal. If, therefore, the image signal from the image processing unit 312 represents a fraudulent image, black solid image data is sent to the LED drive 209, thereby preventing the formation of a fraudulent image.

[Arrangement and Operation of Electronic Sorter Control Unit]

Figure 6:
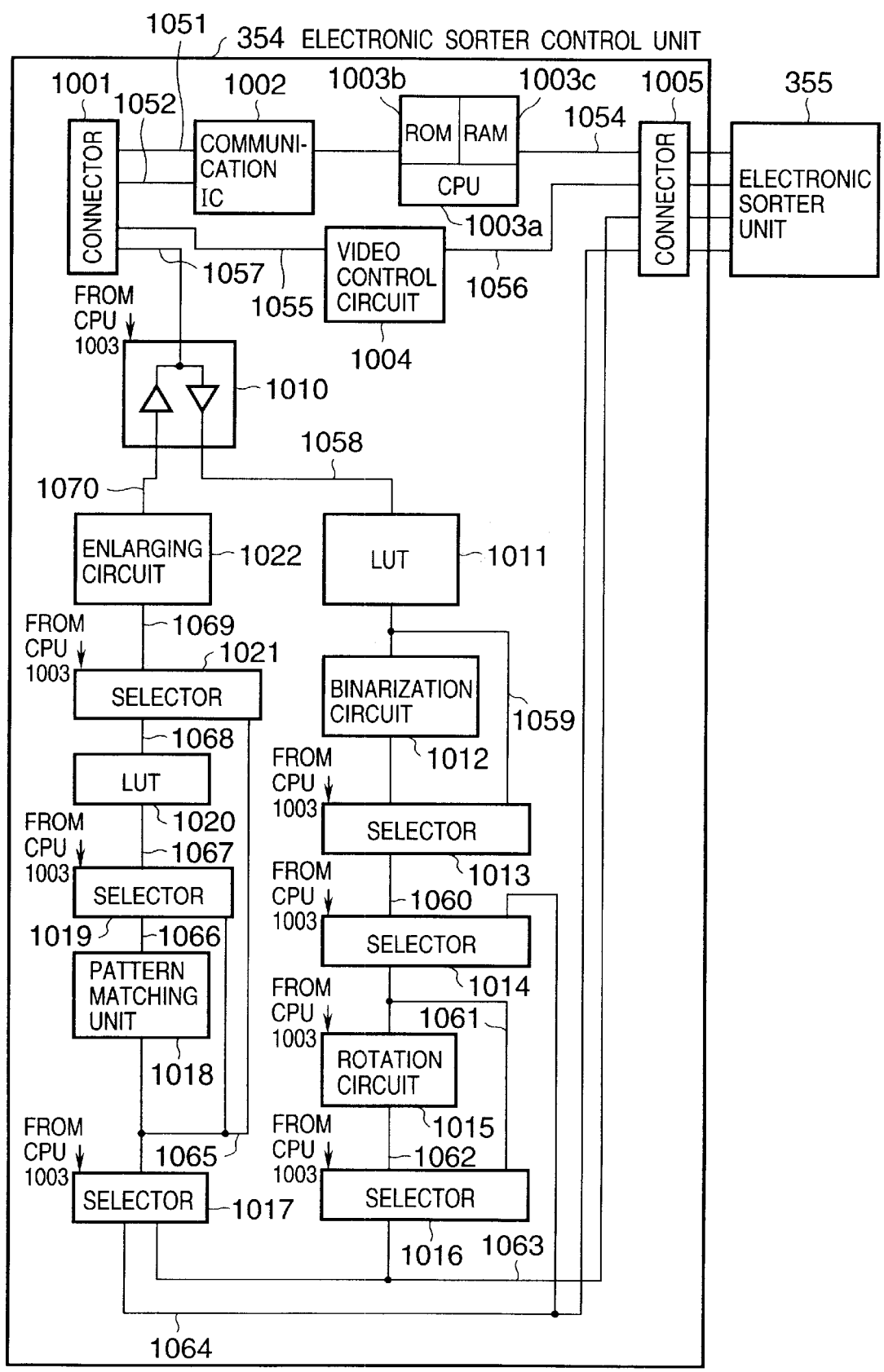
FIG. 6 is a block diagram showing the detailed arrangement of an electronic sorter control unit 354.

The arrangement and operation of the electronic sorter control unit 354 will be described in detail next with reference FIG. 6. FIG. 6 is a block diagram showing the detailed arrangement of the electronic sorter control unit 354.

A connector 1001 of the electronic sorter control unit 354 is connected to the digital image processing unit 312. Four types of signal lines (signal lines 1051, 1052, 1055, and 1057) are connected to the connector 1001. The signal line 1057 is a signal line for 8-bit multilevel video signals. The signal line 1055 is a signal line for control signals for controlling video signals. The signal line 1051 is a signal line for communicating with the CPU 401 in the color reader unit. The signal line 1052 is subjected to communication protocol processing in a communication IC 1002 to transmit communication information to a CPU 1003 through a CPU bus 1053.

The signal line 1057 is a two-way video signal line, through which the electronic sorter control unit 354 can receive image information from the digital image processing unit 312 and output image information to the digital image processing unit 312. The signal line 1057 is connected to a buffer 1010, in which a two-way signal is separated into one-way signals 1058 and 1070.

The signal 1058 is an 8-bit multilevel video signal from the digital image processing unit 312. This signal is input to a LUT 1011 on the next stage. The LUT 1011 converts the image information from the digital image processing unit 312 into a desired value by using a look-up table. An output signal 1059 from the LUT 1011 is input to a selector 1013 through a binarization circuit 1012 or directly. The binarization circuit 1012 has a simple binarization function of binarizing the multilevel signal 1059 with a fixed slice level, a binarization function based on a variable slice level that varies depending on the values of neighboring pixels of a target pixel, and a binarization function based on the error diffusion method. If the binarized information is "0", the information is converted into a multilevel signal "00H". If the information is "1", it is converted into a multilevel signal "FFH". This signal is input to the selector 1013.

The selector 1013 selects the signal from the LUT 1011 or the output signal from the binarization circuit 1012. An output signal 1060 from the selector 1013 is input to a selector 1014. The selector 1014 selects either a video signal 1064 input from the electronic sorter unit 355 to the electronic sorter control unit 354 through a connector 1005 or the output signal 1060 from the selector 1013 in accordance with a command from the CPU 1003. An output signal 1061 from the selector 1014 is directly input to a selector 1016 through a rotation circuit 1015.

The rotation circuit 1015 has the function of rotating an input image signal through +90°, −90°, or +180°. The rotation circuit 1015 stores the output signal 1061 output from the selector 1014, and outputs the stored information upon rotating it in accordance with a command from the CPU 1003.

The selector 1016 selects an output signal 1062 from the rotation circuit 1015 or an output signal 1061 from the selector 1014, and outputs it as a signal 1063 to the connector 1005 for the electronic sorter unit 355 and a selector 1017.

The signal 1063 is of a synchronous 8-bit one-way video bus for transferring image information from the electronic sorter control unit 354 to the electronic sorter unit 355. The signal 1064 is of a synchronous 8-bit one-way video bus for transferring image information from the electronic sorter unit 355.

A video control circuit 1004 controls synchronous buses of the above signals 1063 and 1064. This control is performed by using an output signal 1056 from the video control circuit 1004.

A signal 1054 is connected to the connector 1005. The signal 1054 is of a 16-bit two-way CPU bus, which asynchronously exchanges data commands. Information transfer between the electronic sorter unit 355 and the electronic sorter control unit 354 can be executed by using the above two video buses 1063 and 1064 and the CPU bus 1054.

The signal 1064 from the electronic sorter unit 355 is input to the selector 1014 and selector 1017. The selector 1016 inputs the signal 1064 to the rotation circuit 1015 on the next stage in accordance with a command from the CPU 1003.

The selector 1017 selects the signal 1063 or 1064 in accordance with a command from the CPU 1003. The output signal 1065 from the selector 1017 is input to a pattern matching unit 1018 and selectors 1019 and 1021.

The pattern matching unit 1018 performs pattern matching between the input signal 1065 and a predetermined pattern. If the patterns coincide with each other, a predetermined multilevel signal is output to a signal line 1066. If the patterns do not coincide with each other, the input signal 1065 is output to the signal line 1066.

The selector 1019 selects the signal 1065 or 1066 in accordance with a command from the CPU 1003. An output signal 1067 from the selector 1019 is input to a LUT 1020 on the next stage. The LUT 1020 converts the input signal 1067 in accordance with the characteristics of the printer, when the image information is output to the printer unit, and outputs the resultant signal as a signal 1068.

The selector 1021 selects the output signal 1068 from the LUT 1020 or the signal 1065 in accordance with a command from the CPU 1003. An output signal 1069 from the selector 1021 is input to an enlarging circuit 1022 on the next stage.

The enlarging circuit 1022 can set magnifications in the X and Y directions independently in accordance with commands from the CPU 1003. As an enlargement method, a linear interpolation method is used. The output signal 1070 from the enlarging circuit 1022 is input to the buffer 1010. The signal 1070 input to the buffer 1010 is converted into the two-way signal 1057 in accordance with a command from the CPU 1003. This signal is sent to the printer unit through the connector 1001 to be printed out.

The flows of signals between the electronic sorter control unit 354 and the electronic sorter unit 355 will be described next.

[Operation of Electronic Sorter Control Unit 354 in Accordance with Information from Electronic Sorter Unit 355]

A case wherein image information from the digital image processing unit 312 is output to the electronic sorter unit 355 will be described.

A CPU 1003a communicates with a CPU 122 of the digital image processing unit 312 through a communication IC 1002, and outputs an original scan command. The digital image processing unit 312 scans an original in accordance with this command to output image information to the connector 120 (FIG. 1).

Information from the digital image processing unit 312 is input to the connector 1001 of the electronic sorter control unit 354 (FIG. 6). The image information input to the connector 1001 is converted into the one-way signal 1058 by the buffer 1010. The 8-bit multilevel signal 1058 is converted into a desired signal by the LUT 1011. The output signal 1059 from the LUT 1011 is input to the connector 1005 through the selector 1013, selector 1014, and selector 1016.

That is, the above signal is transferred as the 8-bit multilevel signal to the electronic sorter unit 355 without using the functions of the binarization circuit 1012 and rotation circuit 1015. When a binary signal is to be recorded upon communication between the CPU 1003a and the electronic sorter unit 355 through the CPU bus 1054, the functions of the binarization circuit 1012 and rotation circuit 1015 are used. The binarization circuit 1012 converts the 8-bit multilevel signal 1059 into a binary signal. In this case, the binarization circuit 1012 converts the binarized signal into the multilevel signal "00H" when the signal is "0", and converts it into the multilevel signal "FFH" if the signal is "1".

The output signal from the binarization circuit 1012 is input to the rotation circuit 1015 or selector 1016 through the selectors 1013 and 1014. The output signal 1062 from the rotation circuit 1015 is also input to the selector 1016. The selector 1016 selects the signal 1061 or 1062. To determine a signal to be selected, the CPU 1003a communicates with the electronic sorter unit 355 through the CPU bus 1054. The output signal 1063 from the selector 1016 is sent to the electronic sorter unit 355 through the connector 1005.

A case wherein information is received from the electronic sorter unit 355 and output to the digital image processing unit 312 will be described next.

Image information from the electronic sorter unit 355 is input as the signal 1064 to the selector 1014 or 1017 through the connector 1005. If this signal is 8-bit multilevel data, the signal can be input to the selector 1017. If the signal is binary data, the signal can be input to the selector 1014 or 1017.

When an image from the electronic sorter unit 355 is to be output to the digital image processing unit 312 after rotated in accordance with a command from the CPU 1003a, the signal 1064 input to the selector 1014 is subjected to rotation processing in the rotation circuit 1015. The output signal 1062 from the rotation circuit 1015 is input to the pattern matching unit 1018 through the selectors 1016 and 1017.

When an image from the electronic sorter unit 355 is to be output to the digital image processing unit 312 without any change in accordance with a command from the CPU 1003a, the signal 1064 input to the selector 1017 is input to the pattern matching unit 1018. The pattern matching unit 1018 has the function of detecting edge portions of an image from the electronic sorter unit 355 and smoothing the edge portions to obtain a smooth image. The signal having undergone pattern matching is input to the LUT 1020 through the selector 1019. To output an image from the electronic sorter unit 355 to the digital image processing unit 312 with a desired density, the table of the LUT 1020 can be changed by the CPU 1003a.

The output signal 1068 from the LUT 1020 is input to the enlarging circuit 1022 through the selector 1021. The enlarging circuit 1022 enlarges 8-bit data having two values (00H, FFH) by the linear interpolation method. The 8-bit multilevel signal having many values and output from the enlarging circuit 1022 is sent to the digital image processing unit 312 through the buffer 1010 and connector 1001.

The digital image processing unit 312 inputs this signal to the selector 119 through the connector 120 (FIG. 1).

If the signal from the electronic sorter unit 355 is an 8-bit multilevel data, the output signal 1065 from the selector 1017 is input to the LUT 1020 through the selector 1019. The LUT 1020 forms a look-up table in correspondence with a desired print density in accordance with a command from the CPU 1003a. The output signal 1068 from the LUT 1020 is input to the enlarging circuit 1022 through the selector 1021. The 8-bit multilevel signal 1070 enlarged at a desired magnification by the enlarging circuit 1022 is sent to the digital image processing unit 312 through the buffer 1010 and connector 1001. The information sent from the electronic sorter unit 355 to the digital image processing unit 312 is output to the digital image processing unit 312 as in the case with binary data.

[Arrangement and Operation of Electronic Sorter Unit]

Figure 7:
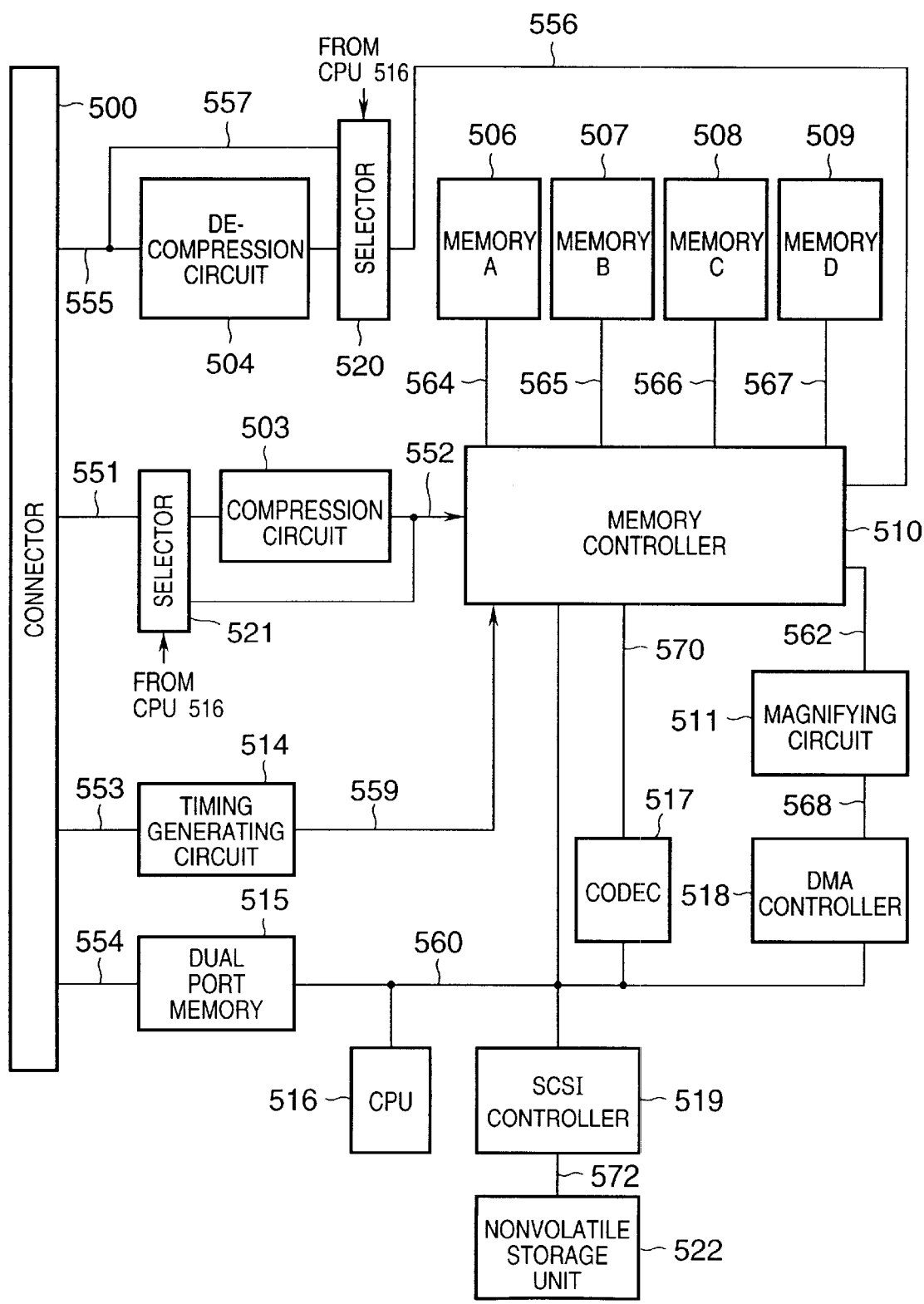
FIG. 7 is a block diagram showing the detailed arrangement of an electronic sorter unit 355.

The arrangement and operation of the electronic sorter unit 355 will be described in detail next with reference to FIG. 7. FIG. 7 is a block diagram showing the detailed arrangement of the electronic sorter unit 355 described above.

The electronic sorter unit 355 is connected to the electronic sorter control unit 354 through a connector 500 to exchange various signals. An image input signal 551 is input to a selector 521. If the image input signal 551 is a multilevel image that is not compressed, the selector 521 is switched under the control of a CPU 516 to input the signal to a compression circuit 503. The multilevel image signal input to the compression circuit 503 is converted into compressed information and output to a memory controller 510. If the selector 521 selects the route bypassing the compression circuit 503, the signal is output to the memory controller 510 without being compressed. A signal 552 is stored in one of memory A 506, memory B 507, memory C 508, and memory D 509 or two pairs of cascaded memories under the control of the memory controller 510.

The memory controller 510 has functions corresponding to the following five modes in accordance with commands from the CPU 516:

(1) the mode of exchanging data between a CPU bus 560 and the memory A 506, memory B 507, memory C 508, and memory D 509;

(2) the mode of exchanging data with a CODEC bus 570 of a CODEC 517 for encoding/decoding data;

(3) the mode of exchanging the contents of the memory A 506, memory B 507, memory C 508, and memory D 509 with a bus 562 from a magnifying circuit 511 under the control of a DMA controller 517;

(4) the mode of storing a signal 553 in one of the memory A 506 to memory D 509 under the control of a timing generating circuit 514; and (5) the mode of reading out contents from one of the memory A 506 to memory D 509 and outputting them to a signal line 556.

Each of the memory A 506, memory B 507, memory C 508, and memory D 509 has a capacity of 2 Mbytes and stores A4-size image data at a resolution of 400 dpi. The timing generating circuit 514 is connected to the connector 500 through the signal line 553 and started by a control signal (HSYNC, HEN, VSYNC, VEN) from the electronic sorter control unit 354 to generate signals for implementing the following two functions. One is the function of storing information from the electronic sorter control unit 354 in one of the memory A 506 to memory D 509. The other is the function of reading out image information from one of the memory A 506 to memory D 509 and transmitting it to the signal line 556.

A dual port memory 515 is connected to the CPU 1003a of the electronic sorter control unit 354 through a signal line 554, and to the CPU 516 of the electronic sorter unit 355 through the signal line 560. The respective CPUs exchange commands through the dual port memory 515.

A SCSI controller 519 interfaces with a nonvolatile storage unit 522 connected to the electronic sorter unit 355 in FIG. 1. The nonvolatile storage unit 522 is a hard disk for storing data such as image information.

The CODEC 517 reads out image information stored in one of the memory A 506 to memory D 509, encodes it according to a desired one of the MH, MR, and MMR schemes, and stores the resultant information as encoded information in one of the memory A 506 to memory D 509. In addition, the CODEC 517 reads out encoded information stored in one of the memory A 506 to memory D 509, decodes it according to a desired one of the MH, MR, and MMR schemes, and stores the resultant information as decoded information, i.e., image information, in one of the memory A 506 to memory D 509.

A case wherein image information is stored in the nonvolatile storage unit 522 will be described below. An image signal from the electronic sorter control unit 354 is input from the connector 500 to the selector 521 through the signal line 551. If the image input signal 551 is a multilevel image that is not compressed, the selector 521 is switched under the control of the CPU 516 to input the signal to the compression circuit 503. The multilevel image signal input to the compression circuit 503 is converted into compressed information and input to the memory controller 510. If the selector 521 selects the route bypassing the compression circuit 503, the signal is input to the memory controller 510 without being compressed.

The memory controller 510 causes the timing generating circuit 514 to generate a timing signal 559 in accordance with the signal 553 from the electronic sorter control unit 354, and stores the compressed signal 552 in the memory A 506 in accordance with the signal 559. The CPU 516 causes the memory controller 510 to connect a bus 564 of the memory A 506 and a bus 565 of the memory B 507 to the bus line 570 of the CODEC 517. The CODEC 517 reads out the compressed information from the memory A 506, encodes it according to the MR scheme, and writes the encoded information in the memory B 507. When the CODEC 517 completes encoding, the CPU 516 connects the memory B 507 of the memory controller 510 to the CPU bus 560. The CPU 516 sequentially reads out the encoded information from the memory B 507 and transfers the information to the SCSI controller 519. The SCSI controller 519 stores encoded information 572 in the nonvolatile storage unit 522.

A case wherein image information is read out from the nonvolatile storage unit 522 and output to the digital image processing unit 312 will be described next.

Upon reception of a command to output image information in accordance with an input from the operation unit 402, the CPU 516 receives encoded information from the nonvolatile storage unit 522 through the SCSI controller 519, and transfers the encoded information to the memory C 508. In this case, the memory controller 510 connects the CPU bus 560 to a bus 566 of the memory C 508 in accordance with a command from the CPU 516. Upon completion of the transfer of the encoded information to the memory C 508, the CPU 516 connects the memory C 508 and memory D 509 to the CODEC bus 570 of the CODEC 517 by controlling the memory controller 510. The CODEC 517 reads out the encoded information from the memory C 508, sequentially decodes the information, and transfers the information to the memory D 509.

Assume that image information needs to be enlarged or reduced when it is output to the digital image processing unit 312. In this case, the memory D 509 is connected to the bus 562 of the magnifying circuit 511, and the contents of the memory D 509 are magnified under the control of a DMA controller 518. The CPU 516 communicates with the CPU 1003 of the electronic sorter control unit 354 through the dual port memory 515, and makes settings to cause the printer unit to print out image data from the memory D 509 through the electronic sorter control unit 354.

After the settings, the CPU 516 starts the timing generating circuit 514 to output a predetermined timing signal from the signal line 559 to the memory controller 510. The memory controller 510 reads out decoded information from the memory D 509 in synchronism with the signal from the timing generating circuit 514, and sends it to the signal line 556.

The signal 556 is input to a selector 520. When this signal is stored in the electronic sorter unit 355, it is checked whether the signal has been compressed by the compression circuit 503. This determination processing is performed by the CPU 516. If the image information has been compressed by the compression circuit 503, the information is decompressed by a decompression circuit 504, and the resultant image information is output as a signal 555. If it is determined that the information has not been compressed by the compression circuit 503, the image information is output as the signal 555 through a signal line 557. The signal 555 is output to the electronic sorter control unit 354 through the connector 500. Since a procedure for outputting the signal from the connector 500 to the digital image processing unit 312 is the same as in the case with the electronic sorter control unit 354, a description thereof will be omitted.

Assume that image information from the digital image processing unit 312 is to be recorded on the electronic sorter unit 355. In this case, together with the image information, the digital image processing unit 312 transfers a fraudulent image identification result information signal indicating the determination whether the image information represents an image that is prohibited from being printed on an output sheet, i.e., a fraudulent image like the one described above, to the electronic sorter control unit 354. The fraudulent image identification result information signal transferred to the electronic sorter control unit 354 is received by the CPU 1003a through the connector 1001 of the electronic sorter control unit 354 and the CPU bus 1053, and is also notified to the CPU 516 of the electronic sorter unit 355 through the connectors 1005 and 500 and dual port memory 515.

In order to record image information on the electronic sorter unit 355 at a higher speed, image recording must be started before the digital image processing unit 312 acquires fraudulent image identification result information by fraudulent image identification processing. Assume that image information from the digital image processing unit 312 represents a fraudulent image. In this case, therefore, even if image recording on the electronic sorter unit 355 is interrupted, there is a possibility that the image recording has been completed. In addition, even if image recording can be interrupted before the completion of image recording, subsequent restoring processing becomes considerably complicated.

Figure 8:
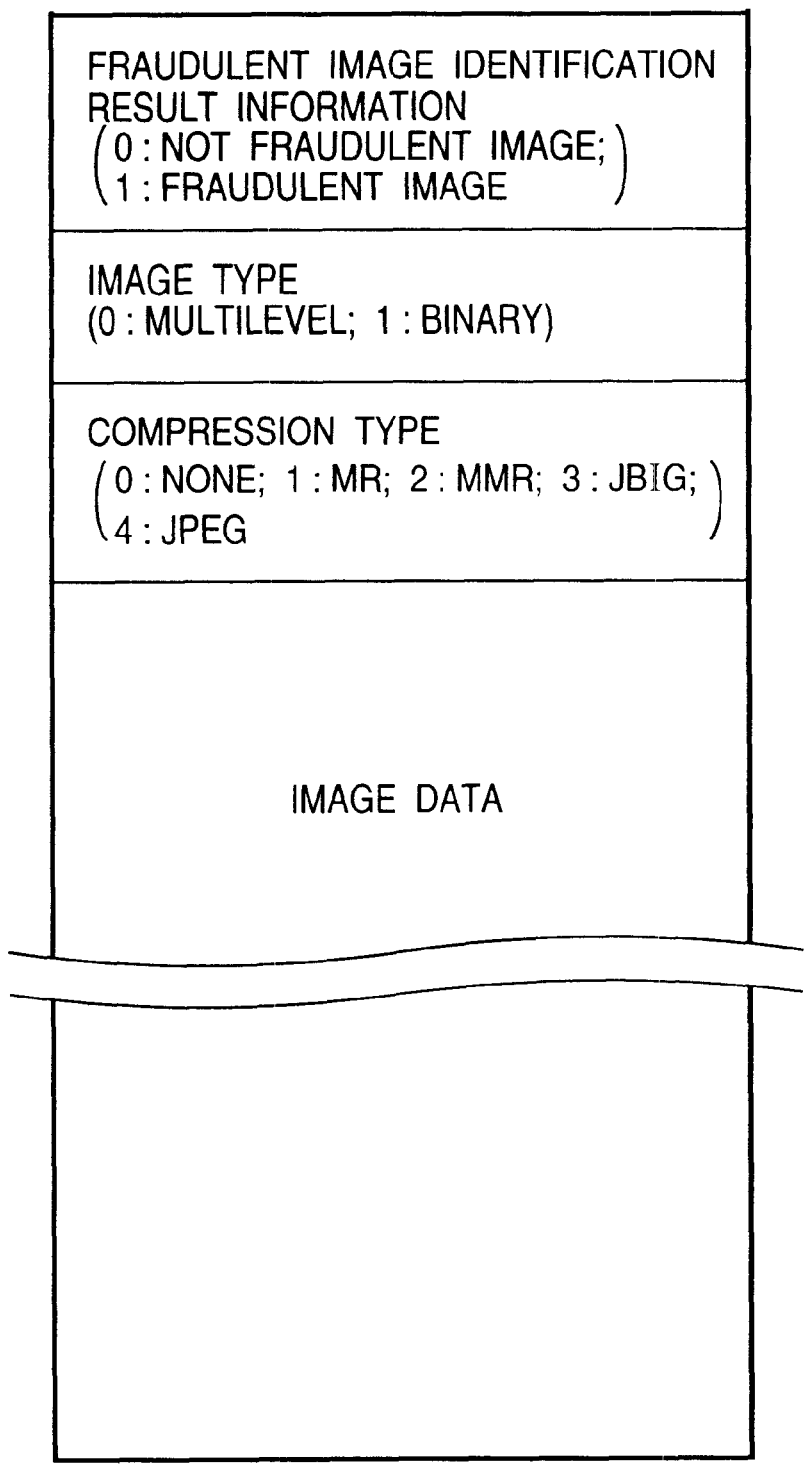
FIG. 8 is a view showing an example of the format of image information data containing fraudulent image identification result information stored in a nonvolatile storage unit 522 of the electronic sorter unit 355.

In this embodiment, therefore, even if image information data from the digital image processing unit 312 represents a fraudulent image, the image data is recorded as in a normal case, and the fraudulent image identification result information transferred from the digital image processing unit 312 is additionally recorded on this fraudulent image information data. When this image is to be output to the printer unit through the digital image processing unit 312, the fraudulent image identification result information recorded together with the image data is transferred again to the digital image processing unit 312 to prevent the fraudulent image data from being output to the printer unit. FIG. 8 shows the format of image information data containing fraudulent image identification result information and stored in the nonvolatile storage unit 522 of the electronic sorter unit 355.

When the fraudulent image identification result information recorded on the electronic sorter unit 355 is to be transferred again to the digital image processing unit 312, the CPU 516 notifies, through the dual port memory 515, the CPU 1003 of the fraudulent image identification result information read out from the nonvolatile storage unit 522. In addition, the CPU 1003 generates a fraudulent image identification result information signal in accordance with the information and outputs it to the digital image processing unit 312 through the connector 1001.

In this image forming apparatus, the electronic sort function is implemented by using the electronic sorter control unit 354 and electronic sorter unit 355. More specifically, by temporarily storing a plurality of image information data from the digital image processing unit 312, for example, image information data can be output in an arbitrary output order, and a plurality of copies of the same image information data can be output. In addition, if the storage capacity of the nonvolatile storage unit 522 of the electronic sorter unit 355 is sufficiently large, each of the CPUs 1003a and 516 may have the function of managing and holding stored image information data for a long term, thereby allowing the user to reuse previously stored image information data and output it.

The electronic sorter control unit 354 and electronic sorter unit 355 described above are integrated into an electronic sorter unit 356 (FIG. 3), which can be easily attached/detached to/from the image forming apparatus of this embodiment for the following reasons. The electronic sorter function is not an indispensable function for the image forming apparatus. In addition, the unit including the electronic sorter control unit 354 and electronic sorter unit 355 is expensive. For this reason, considering the image forming apparatus of this embodiment as a product, sufficient consideration must be given to a product form without the electronic sort function in terms of the product cost.

In the image forming apparatus of this embodiment, even if the operator mistakenly tries to copy an original image that is prohibited from being copied, e.g., paper currency or note, the copying result becomes a black solid image owing to the arrangement described above. As a consequence, no fraudulent image can be copied. This equally applies to a general printer and a printer using an electronic sorter function.

Figure 9A:
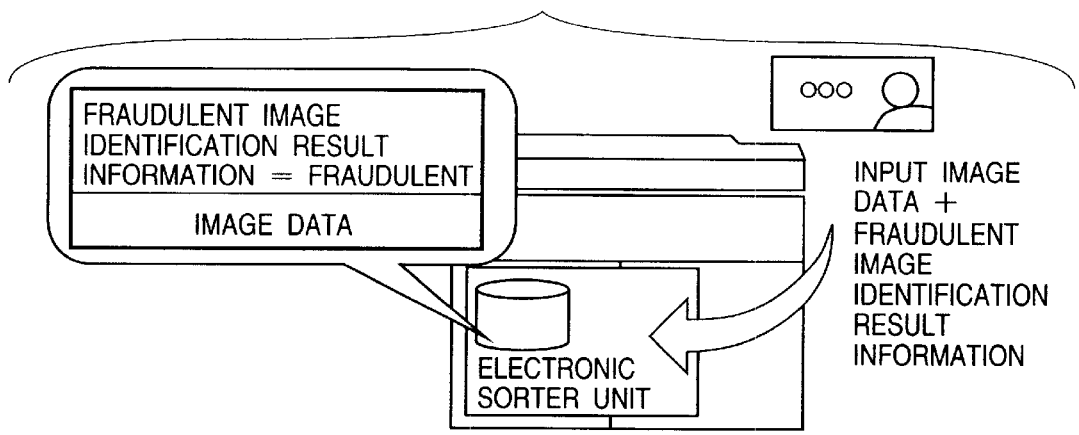
FIGS. 9A to 9C are views schematically showing a method of intentionally copying a fraudulent image.
Figure 9B:
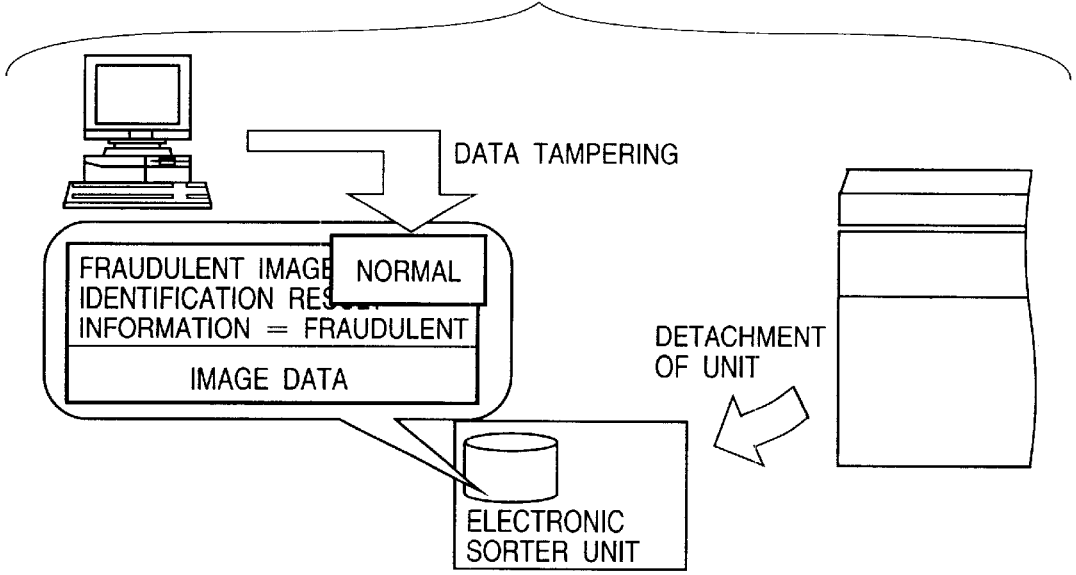
Figure 9C:
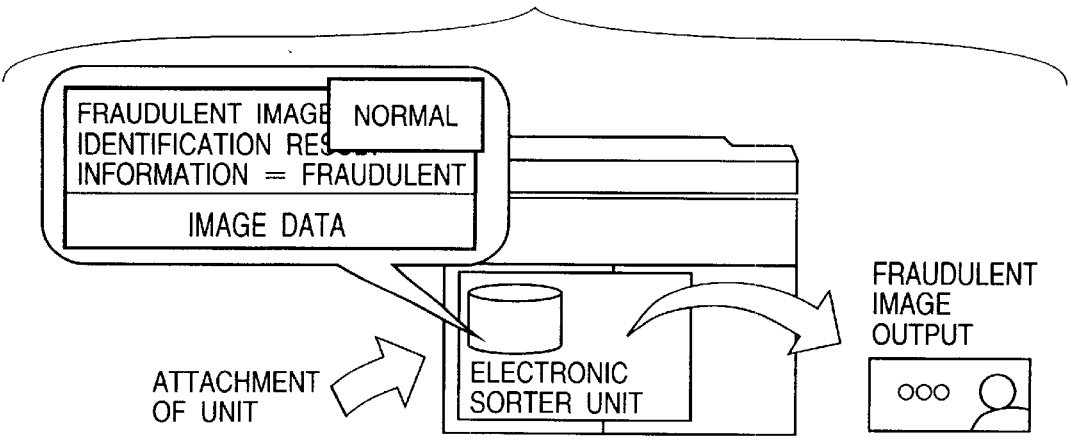

Assume that the operator intentionally copies a fraudulent image. In the image forming apparatus having the above arrangement, the following method may be used. FIGS. 9A to 9C schematically show the method. First of all, as shown in FIG. 9A, the operator stores the fraudulent image data in the nonvolatile storage unit 522 in the electronic sorter unit 355 by using the electronic sorter function. In this case, since information indicating that the image is fraudulent is added to the image information data stored in the nonvolatile storage unit 522, this image cannot be transferred to the printer unit to be printed out in a normal use.

As shown in FIG. 9B, however, the operator may detach the electronic sorter unit with the image information data being stored in the nonvolatile storage unit 522, alter the fraudulent image identification result information added to the image information data by using another device capable of rewriting data in the nonvolatile storage unit 522, and connect the electronic sorter unit to the image forming apparatus again. In this case, as shown in FIG. 9C, a fraudulent image can be printed out.

In this embodiment, therefore, the connection portion between the electronic sorter unit 356 and the main body of the image forming apparatus has the following arrangement to solve this problem.

Figure 10:
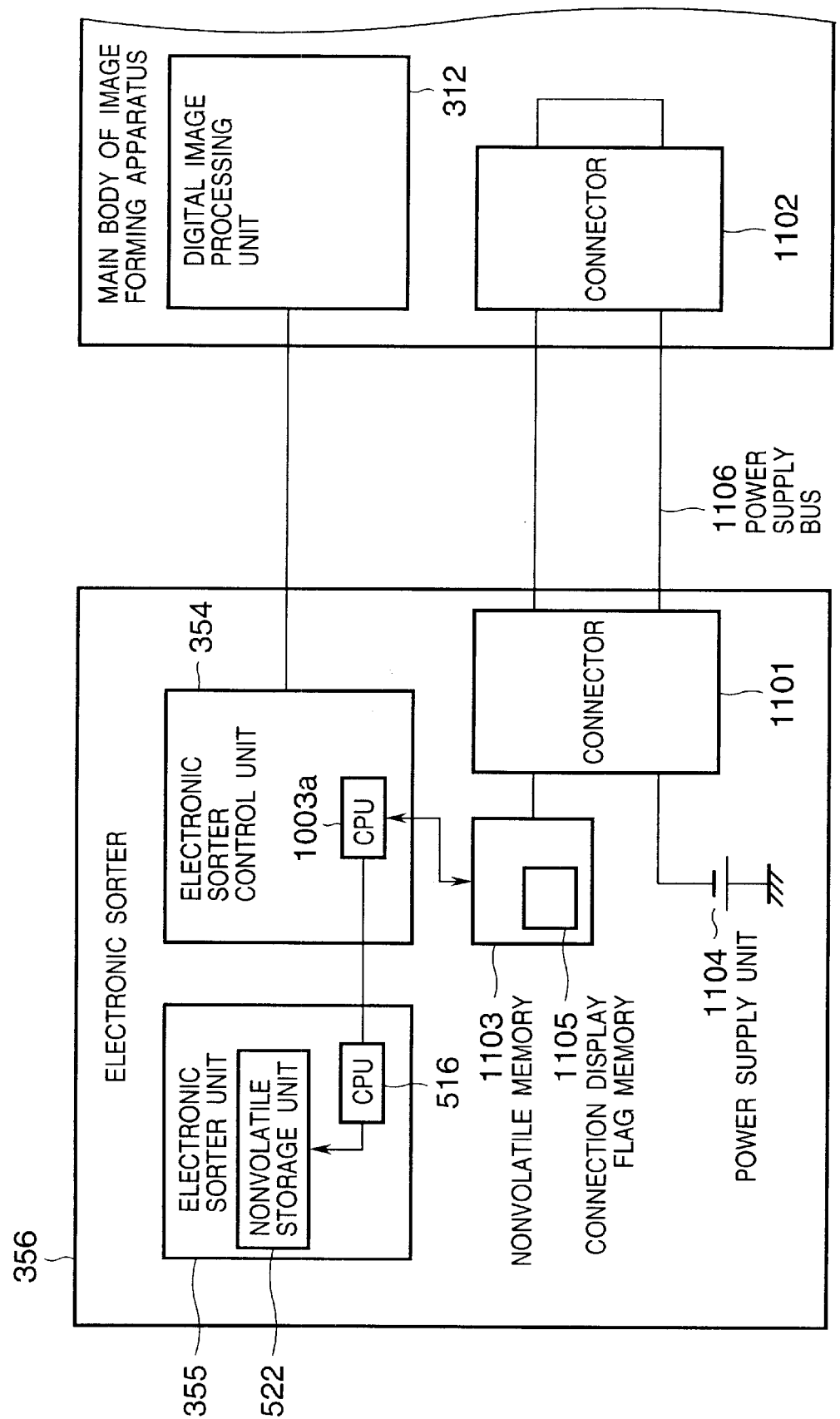
FIG. 10 is a block diagram showing the arrangement of a connection portion between the electronic sorter unit 356 and the main body of the image forming apparatus.

FIG. 10 shows the arrangement of the connection portion between the electronic sorter unit 356 and the main body of the image forming apparatus in this embodiment. At the connection portion between the electronic sorter unit 356 and the main body of the image forming apparatus, connection is made not only by the connector 1001 of the electronic sorter control unit 354 and the connector 120 of the digital image processing unit 312 but also by a connector 1101 on the electronic sorter control unit 354 side and a connector 1102 on the image forming apparatus side, as shown in FIG. 10.

The electronic sorter unit 356 has a nonvolatile memory 1103 connected to the connector 1101 and a power supply unit 1104 for supplying power necessary for data holding to the nonvolatile memory 1103. The nonvolatile memory 1103 is a small memory having a storage capacity of about one byte at most, and holds a connection display flag memory 1105 for indicating whether the electronic sorter unit 356 is kept connected to the image forming apparatus. The power supply unit 1104 is a power supply independent of the power supply of the main body of the image forming apparatus, and is designed to supply power while the power supply of the main body of the image forming apparatus is off. A power supply bus 1106 that connects the power supply unit 1104 to the nonvolatile memory 1103 is connected through the connectors 1101 and 1102. For this reason, when the electronic sorter unit 356 is detached from the main body of the image forming apparatus, the supply of power is interrupted, and all the contents stored in the nonvolatile memory 1103 including the connection display flag memory 1105 volatize. As a consequence, the nonvolatile memory 1103 is initialized.

Figure 11:
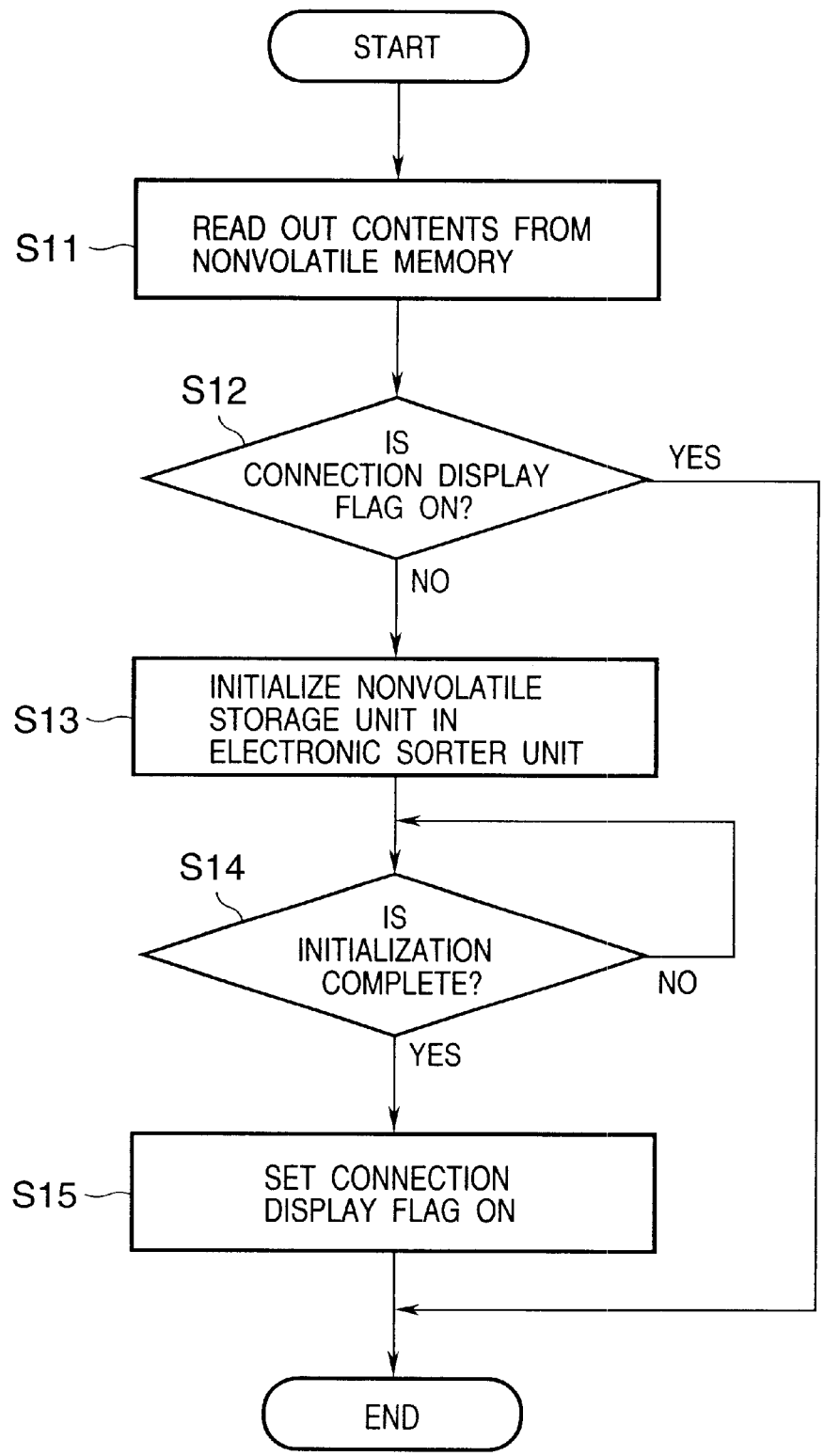

FIG. 11 is a flow chart for explaining the operation of the electronic sorter control unit in this embodiment at power-on.

When the power supply of the main body of the image forming apparatus is turned on, the CPU 1003a of the electronic sorter control unit 354 reads out data from the connection display flag memory 1105 in the nonvolatile memory 1103 (step S11). The CPU 1003a then checks whether the connection display flag indicates the continuation of connection (step S12).

If the flag memory 1105 is initialized, the CPU 1003a instructs the CPU 516 of the electronic sorter unit 355 to initialize the nonvolatile storage unit 522 of the electronic sorter unit 355 (step S13). After the nonvolatile storage unit 522 of the electronic sorter unit 355 is completely initialized, the CPU 1003a stores, in the flag memory 1105, information indicating that the electronic sorter unit 356 is kept connected to the main body of the image forming apparatus (steps S14 and S15).

As described above, the contents stored in the connection display flag memory 1105 are not initialized unless the connector of the electronic sorter unit 356 is disconnected from the connector of the main body of the image forming apparatus. For this reason, when the power supply of the main body is turned on afterward, the nonvolatile storage unit 522 of the electronic sorter unit 355 is not initialized. In contrast to this, when the electronic sorter unit 356 is detached, the contents of the flag memory 1105 are initialized without fail. The above arrangement can therefore prohibit the operator from intentionally printing out any fraudulent image by the method described with reference to FIGS. 9A to 9C.

This embodiment specifically aims at prohibiting the operator from printing out any fraudulent image. In order to achieve this object, the nonvolatile storage unit 522 of the electronic sorter unit 355 is initialized when attachment/detachment of the electronic sorter unit 355 to/from the image forming apparatus is detected. However, this function may be simply used to automatically detect attachment of the electronic sorter unit 356 to the image forming apparatus and automatically initialize the nonvolatile storage unit 522 of the electronic sorter unit 355.

In this embodiment, as a means for detecting continuation of connection of the electronic sorter unit 356 to the image forming apparatus, which is connected between the electronic sorter unit and the image forming apparatus, the nonvolatile memory 1103 and power supply unit 1104 are arranged on the electronic sorter unit 356 side, and the power supply bus 1106 for connecting the nonvolatile memory 1103 to the power supply unit 1104 is placed on the image forming apparatus side. However, as long as supply of power to the nonvolatile memory 1103 is stopped when the electronic sorter unit 356 is detached from the image forming apparatus, the nonvolatile memory 1103, power supply unit 1104, power supply bus 1106, and the like may be arbitrarily arranged. As a means for detecting continuation of connection of the electronic sorter unit 356, a function similar to the one described above may be realized by using a known arrangement capable of detecting detection other than that in this embodiment.

In this embodiment, for the sake of simple explanation, one bus line is used as the power supply bus 1106 for connecting the nonvolatile memory 1103 and power supply unit 1104 to each other, which are parts of the means for detecting whether the electronic sorter unit 356 is kept connected to the image forming apparatus. A plurality of dummy bus lines may be arranged independently of the power supply bus 1106 to prevent the operator from easily identifying the power supply bus 1106, thereby preventing the operator from being stimulated to perform fraudulent operation when he/she identifies the power supply bus 1106.

Furthermore, in this embodiment, for the sake of simple explanation, the connectors 1101 and 1102 for connecting the power supply bus 1106 for connecting the nonvolatile memory 1103 and power supply unit 1104 to each other, which are parts of the means for detecting whether the electronic sorter unit 356 is kept connected to the image forming apparatus, are prepared independently of the image data bus and CPU bus connectors between the electronic sorter unit 356 an the image forming apparatus, i.e., the connectors 500 and 1005. However, the connectors 1101 and 500 and the connectors 1102 and 1005 may be common connectors to prevent the operator from easily knowing the function of the power supply bus 1106, thereby preventing the operator from being stimulated to perform fraudulent operation when he/she is made known the function of the power supply bus 1106.

In this embodiment, the nonvolatile storage unit 522 of the electronic sorter unit 355 is described as a hard disk. Obviously, however, another storage unit having a nonvolatile storage function, e.g., a nonvolatile RAM, may be used as the nonvolatile storage unit 522.

In this embodiment, the color reader unit is used to input an original image. Obviously, however, the processing as that described above can be performed by using image information input from the facsimile apparatus 501, LAN interface device 502, or compression circuit 503 connected to the image processing apparatus through the external I/F 313.

In this embodiment, the means for detecting whether the electronic sorter unit 356 is kept connected to the image forming apparatus is connected between the electronic sorter unit 356 and the image forming apparatus. If, however, there is a possibility that the operator can fraudulently change the contents stored in the nonvolatile storage unit 522 by attaching/detaching the components of the electronic sorter unit 355, including the nonvolatile storage unit 522, a similar detection function may be provided for the connection portion between the components to prevent the operator from performing fraudulent operation.

In this embodiment, when the electronic sorter unit 356 is detached from the image forming apparatus, the nonvolatile storage unit 522 of the electronic sorter unit 355 is automatically initialized. However, the CPU 401 of the image forming apparatus may independently store, in advance, information indicating that fraudulent image data is stored immediately before the 356 is detached. With this operation, when the operator attaches/detaches the electronic sorter unit 356, this attaching/detaching operation is determined as fraudulent operation of outputting a fraudulent image, and the use of the image forming apparatus itself can be prohibited.

In the above embodiment, when the electronic sorter unit is detached, the nonvolatile storage unit 522 is initialized. However, all the data stored in the nonvolatile storage unit 522 may be erased.

As described above, since the above embodiment has the function of detecting that the electronic sorter unit is detached from the main body of the image forming apparatus, when it is determined that the electronic sorter unit is detached, the data recorded on the large-capacity storage medium in the unit can be automatically initialized, or the use of the image forming apparatus itself can be prohibited thereafter. This makes it possible to prevent counterfeiting of fraudulent images of paper currency, notes, and the like.

In addition, since initial attachment of the electronic sorter unit can also be determined by the detection function, when the electronic sorter unit is attached to the image forming apparatus for the first time, the unit can be automatically initialized. This improves the operability of the apparatus.

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:

first storage means for storing image information as image data in a detachable storage unit;

second storage means for determining whether the image information stored in said storage unit is a copy-prohibited image, and storing determination information indicating the determination result in said storage unit in correspondence with the image data;

image formation control means for permitting formation of an image of the image data stored in said storage unit when the determination information corresponding to the image data permits copy operation;

detection means for detecting occurrence of detachment of said storage unit in the past; and erase means for erasing contents stored in said storage unit when said detection means detects occurrence of detachment of said storage unit in the past.

2. The apparatus according to claim 1, further comprising input means for inputting image data to be stored by said first storage means.

3. The apparatus according to claim 2, wherein said input means optically reads an image and generates image data.

4. The apparatus according to claim 1, wherein said storage unit comprises at least one of a hard disk and nonvolatile RAM.

5. The apparatus according to claim 1, wherein said storage unit is included in an electronic sorter unit that can be attached/detached to/from a main body of said apparatus.

6. The apparatus according to claim 1, wherein said detection means includes a storage area to which power is supplied to hold stored data only while said storage unit is attached to the main body, and detects on the basis of a stored state of information in the storage area that said storage unit was detached in the past.

7. The apparatus according to claim 6, wherein information indicating continuation of a connected state of said storage unit is stored in the storage area.

8. The apparatus according to claim 6, wherein said detection means checks contents in the storage area when said apparatus is started up.

9. The apparatus according to claim 6, wherein the storage area is included in said storage unit.

10. The apparatus according to claim 1, further comprising output means for outputting a visual image on the basis of image data which is permitted by said image formation control means to be used to form an image.

11. The apparatus according to claim 1, further comprising prohibition means for prohibiting operation of said apparatus when said detection means detects detachment of said storage unit in the past.

12. An image processing apparatus comprising:

first storage means for storing image information as image data in a detachable storage unit;

second storage means for determining whether the image information stored in said storage unit is a copy-prohibited image, and storing determination information indicating the determination result in said storage unit in correspondence with the image data;

image formation control means for permitting formation of an image of the image data stored in said storage unit when the determination information corresponding to the image data permits copy operation;

detection means for detecting occurrence of detachment of said storage unit in the past; and prohibition means for prohibiting operation of said apparatus when said detection means detects occurrence of detachment of said storage unit in the past.

13. An image processing method comprising:

the first storage step of storing image information as image data in a detachable storage unit;

the second storage step of determining whether the image information stored in said storage unit is a copy-prohibited image, and storing determination information indicating the determination result in said storage unit in correspondence with the image data;

the image formation control step of permitting formation of an image of the image data stored in said storage unit when the determination information corresponding to the image data permits copy operation;

the detection step of detecting occurrence of detachment of said storage unit in the past; and the erase step of erasing contents stored in said storage unit when occurrence of detachment of said storage unit in the past is detected in the detection step.

14. The method according to claim 13, further comprising the input step of inputting image data to be stored in the first storage step.

15. The method according to claim 14, wherein the input step comprises optically reading an image and generating image data.

16. The method according to claim 13, wherein said storage unit comprises at least one of a hard disk and nonvolatile RAM.

17. The method according to claim 13, wherein said storage unit is included in an electronic sorter unit that can be attached/detached to/from a main body of said apparatus.

18. The method according to claim 13, wherein the detection step comprises having a storage area to which power is supplied to hold stored data only while said storage unit is attached to the main body, and detecting on the basis of a stored state of information in the storage area that said storage unit was detached in the past.

19. The method according to claim 18, wherein information indicating continuation of a connected state of said storage unit is stored in the storage area.

20. The method according to claim 18, wherein the detection step comprises checking contents in the storage area when said apparatus is started up.

21. The method according to claim 13, further comprising the output step of outputting a visual image on the basis of image data which is permitted in the image formation control step to be used to form an image.

22. The method according to claim 13, further comprising the prohibition step of prohibiting operation of said apparatus when detachment of said storage unit in the past is detected in the detection step.

23. An image processing method comprising:

the first storage step of storing image information as image data in a detachable storage unit;

the second storage step of determining whether the image information stored in said storage unit is a copy-prohibited image, and storing determination information indicating the determination result in said storage unit in correspondence with the image data;

the image formation control step of permitting formation of an image of the image data stored in said storage unit when the determination information corresponding to the image data permits copy operation;

the detection step of detecting occurrence of detachment of said storage unit in the past; and the prohibition step of prohibiting operation of said apparatus when occurrence of detachment of said storage unit in the past is detected in the detection step.

24. A storage medium storing a control program for making a computer control image formation processing, the control program comprising:

a code for the first storage step of storing image information as image data in a detachable storage unit;

a code for the second storage step of determining whether the image information stored in said storage unit is a copy-prohibited image, and storing determination information indicating the determination result in said storage unit in correspondence with the image data;

a code for the image formation control step of permitting formation of an image of the image data stored in said storage unit when the determination information corresponding to the image data permits copy operation;

a code for the detection step of detecting occurrence of detachment of said storage unit in the past; and a code for the erase step of erasing contents stored in said storage unit when occurrence of detachment of said storage unit in the past is detected in the detection step.

25. A storage medium storing a control program for making a computer control image formation processing, the control program comprising:

a code for the first storage step of storing image information as image data in a detachable storage unit;

a code for the second storage step of determining whether the image information stored in said storage unit is a copy-prohibited image, and storing determination information indicating the determination result in said storage unit in correspondence with the image data;

a code for the image formation control step of permitting formation of an image of the image data stored in said storage unit when the determination information corresponding to the image data permits copy operation;

a code for the detection step of detecting occurrence of detachment of said storage unit in the past; and a code for the prohibition step of prohibiting operation of said apparatus when occurrence of detachment of said storage unit in the past is detected in the detection step.

* * * * *